United States Patent

[11] 3,595,275

| [72] | Inventors | Thornton Steans; |
| | | Lewis B. Thompson, Jr., both of |
| | | Winchester, Mass. |
| [21] | Appl. No. | 747,134 |
| [22] | Filed | July 24, 1968 |
| [45] | Patented | July 27, 1971 |
| [73] | Assignee | Vacuum Barrier Corporation |
| | | Woburn, Mass. |

[54] SPACER MEANS FOR CRYOGENIC COAXIAL TUBING
12 Claims, 9 Drawing Figs.

| [52] | U.S. Cl. | 138/114, 138/148, 138/149 |
| [51] | Int. Cl. | F16l 9/18 |
| [50] | Field of Search | 138/111, 112, 113, 114, 115, 148, 149, 129; 220/9 |

[56] References Cited
UNITED STATES PATENTS

| 3,009,600 | 11/1961 | Matsch | 220/9 |
| 3,332,446 | 7/1967 | Mann | 138/114 |

Primary Examiner—Louis K. Rimrodt
Attorney—Rowland V. Patrick

ABSTRACT: Spacer means for semiflexible coaxial tubing comprises a strip of fibrous thermal insulating material having an abrasive resistant facing or facings helically wound singly or doubly with opposite pitch around an inner tube. The spacer means may include a moisture impermeable package, enclosing getter particles, functioning as one or both of the facings after rupture to expose the particles. The spacer means is useful in coaxial tubing having evacuated annular spaces radially inwardly and radially outwardly of intermediate concentric tubing providing an annular concentric space for flow of fluid between said evacuated spaces.

PATENTED JUL 27 1971 3,595,275

SPACER MEANS FOR CRYOGENIC COAXIAL TUBING

This invention relates to cryogenic coaxial tubing having a minimum heat loss spacer means maintaining inner and outer flexible tubes in radially spaced relation while accommodating differential lengthwise thermal contraction of the tubes and without lessening the flexiblity of the overall tubing or detrimentally affecting ready evacuation to vacuum of remaining annular space between the tubes. Such tubing is used both as transfer lines for cryogenic gases and as conduits for superconductors.

Certain aspects of the invention may find useful application where one or both of the tubes are rigid.

It has heretofore been proposed to use as spacers in coaxial tubing solid metal or plastic strips helically wound around the inner tube in spaced convolutions to reduce the area of bridging contact of solid material between the tubes.

It has also been previously proposed to interpose full coverage sheet insulating material, as disclosed in U.S. Pat. No. 3,240,234, between inner and outer tubes. In the copending application of one of us, Ser. No. 697,747, filed Jan. 15, 1968, now U.S. Pat. No. 3,490,496, there is disclosed a combination of both.

According to the present invention, joint use of insulating material of low conductivity with a solid spacer material is avoided by fabricating narrow strip helically wound spacer means (which has spaced convolutions) itself from fibrous insulating material.

To this end, a continuous narrow strip of multilayer material is fabricated from a web of fibers oriented as described in U.S. Pat. Nos. 3,009,600 and 3,265,236. In certain embodiments, the material is faced on one or both sides with abrasive-resistant facings, such as foil, metallized plastic sheet material, or net, knit, or woven fabric and the composite is secured together as by stitching, tying or helically winding with a strand material or thread of low conductivity such as cotton or rayon to unify the strip and stabilize it against disruptive elongation.

Where the facings have a continuous surface, they may be corrugated to give better transverse flexibility to the strip.

Such strips lend themselves particularly to use as double counterwound spacing material—one strip being wound clockwise and then a second strip being wound counterclockwise thereover to give crossover points of double thickness as spacing support points.

In addition, such strips lend themselves to the inclusion of dry getter particles which can be sealed beneath one facing either by heat sealing the side edges of two opposed moisture-resistant oversize facings together or by packaging the composite in a moisture-resistant tubing. In either case side edges of the package are ruptured prior to installation to reduce thermal conduction depthwise and simultaneously expose the contained getter particles for getter function through the ruptures.

Various embodiments of the invention are shown in the accompanying drawings wherein.

Figure 1:
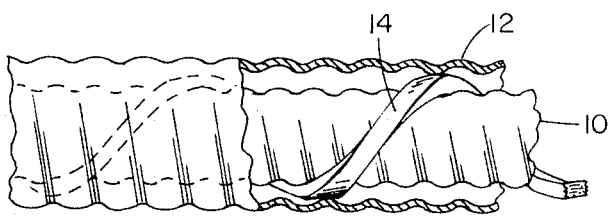
FIG. 1 is a side-elevational view, partly broken away, showing a coaxial tubing having spacer means in accordance with the invention.

FIG. 1 shows diagrammatically coaxial tubing including an inner corrugated copper tube 10, a surrounding external corrugated copper tube 12 and an intervening spacer means 14 helically wound around the inner tube 10 with spaced convolutions.

Figure 2:
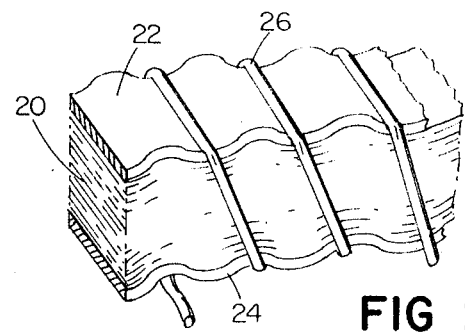
FIG. 2 is an enlarged fragmentary view of one form of spacer means.

The spacer means 14 is shown in more detail in FIG. 2 and comprises a strip bundle including an internal layer 20 of insulating material which is preferably composed of webs of glass fibers oriented in the longitudinal direction substantially perpendicular to the direction of heat inleak across the insulating space as disclosed in U.S. Pat. Nos. 3,009,600 and 3,265,236. A sheet facing 22 of corrugated metallized Mylar or metal foil preferably covers the top of the strip and the entire strip is then held in unitary form and stabilized by a thread 26 which binds the whole into a bundle.

The facings 22 and 24 impart surface abrasion resistance to the portions of the strip 14 which contact the inner and outer tubes 10 and 12. In addition, the strand material binds the bundle tightly to resist stretch during installation.

Figure 3:
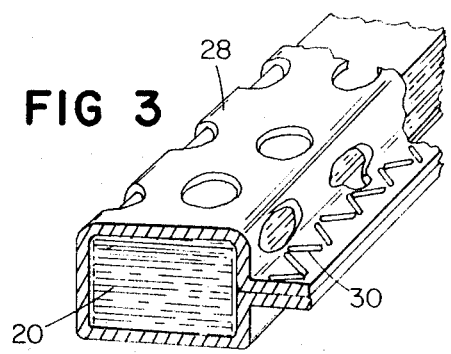
FIG. 3 is a similar fragmentary view illustrating a different form of spacer means.

FIG. 3 shows a modification wherein the internal layers 20 are bound into a bundle by a tubular covering 28 which can be textile or plastic netting formed into a tube by stitching 30.

Figure 4:
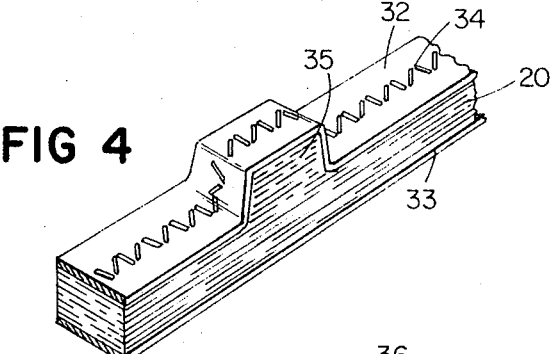
FIGS. 4 and 5 illustrate still different forms of spacer means.

FIG. 4 illustrates an embodiment of the invention where the facing 22 of FIG. 2 is replaced by abrasion resistant woven fabric facings 32 and 33 which are stitched through and through by stitching with cotton, rayon or other strand material 34.

FIG. 4 also illustrates adding layers of the insulating material 20 at spaced intervals along the strip to provide spaced support areas 35 of greater thickness. These may be spaced along the strip so, for example, that they appear four times in each revolution of the strip in its spiral winding as shown in FIG. 1.

Figure 5:
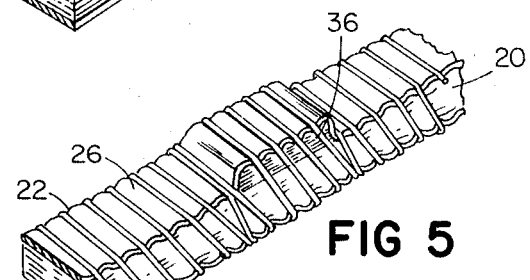

FIG. 5 is a view similar to FIG. 4 but using the bundling strand material 26 of FIG. 2. Moreover, the added layers 36 are precompressed in order to get better stability at the points of bridging contact with tubes 10 and 12. Alternatively, the whole area may be precompressed.

Figure 6:
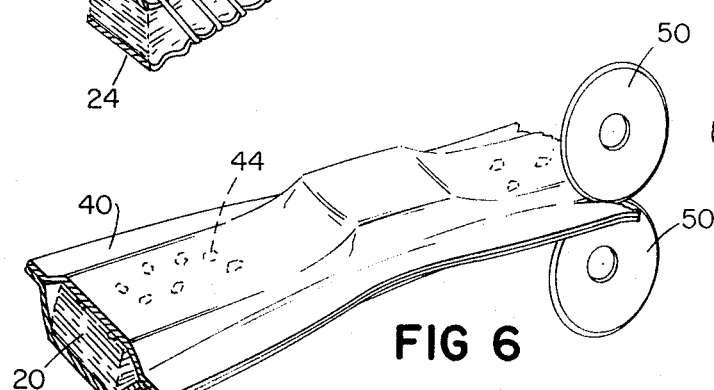
FIG. 6 is a similar fragmentary view of a still different form of spacer means illustrating a cutting operation utilized prior to use.
Figure 6A:
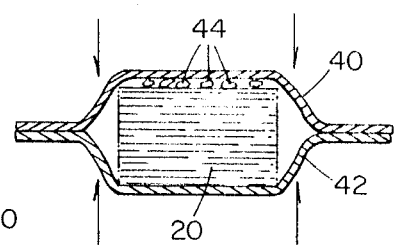
FIG. 6a is a cross-sectional view taken along the line 6a–6a of FIG. 6.

FIG. 6 uses the same internal insulating material layer 20 with the spaced patches of added thickness but they are hermetically sealed between two strips of moisture-impermeable material 40, 42 which are heat sealed together along their edges so as to permit the inclusion beneath the facing 40 of getter particles 44. With the ends of the material in indeterminate lengths also closed by heat sealing, the article of FIG. 6 constitutes a prepackaged spacing means which has its side edges cut as by cutting wheels shown at 50 just prior to installation so as to expose the getter particles for use in evacuating the space between the two tubes 10 and 12. Usually, the facing 40 having the getter material underneath it will be placed against the cold or inner tube. Alternatively, the package may must be perforated if too great heat leakage does not occur across the remaining cover.

Figure 7:
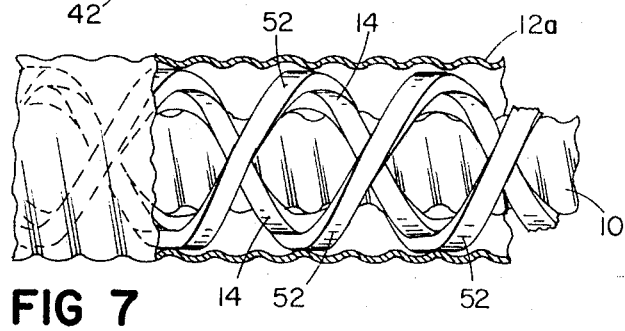
FIG. 7 is a view similar to FIG. 1 of a form of coaxial tubing having counterwound spacing means.

FIG. 7 illustrates utilization of two of any of the aforementioned strips of spacer means between corrugated tubing 10 and an outer tubing 12a. The inner spacer means 14 is wound in one direction about the tube 10 and an overlying spacer strip 52 is wound in the other direction so that the two cross at every 90° interval or other intervals of revolution and thus provide spacer support areas of double thickness along the length of the tubes.

Figure 8:
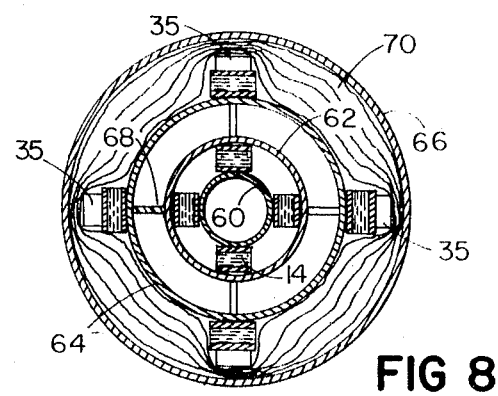
FIG. 8 is a cross-sectional view showing a form of utilization of the spacer means of the invention in a gas-cooled, cryogenic, flexible, coaxial tubing application.

FIG. 8 shows a composite construction wherein there is an inner tube 60 and surrounding concentric tubes of greater diameters 62, 64 and 66.

The tube 62 is spaced from the tube 60 by a suitable spacer means 14 of low conductivity since at the very low temperatures contemplated heat losses are mostly by conduction and not radiation. The tubes 62 and 64 can then be spaced with a single spirally wound strip of twisted or untwisted plastic ribbon 68, and the tubes 64 and 66 are spaced by FIG. 4 spacers or double convolutions as shown in FIG. 7 may be used. In addition, fibrous sheet insulating material 70 with 100 percent coverage is shown in the remaining space 70 between the outer two tubes 64 and 66, for example interspersed multiple layers of fibrous and heat reflective material as shown in U.S. Pat. No. 3,265,236. In a construction of this type having a cryogenic fluid, e.g., helium, with or without an electrical conductor within tube 60, the annular space between tubes 60 and 62 is evacuated. The next outer annular space between the tubes 62 and 64 may contain the same or another cryogenic fluid, e.g., liquid nitrogen, and the annular space between 64 and 66 can be evacuated.

In FIG. 8, the tubes may be rigid or corrugated for semiflexibility.

What we claim is:

1. In combination with flexible cryogenic coaxial tubing comprising inner and outer coaxially spaced flexible corrugated tubes, spacer means maintaining said tubes in radially spaced relation without adversely affecting the flexibility comprising
   a continuous narrow strip of thermal insulating material helically wound around said inner tube in one direction with spaced convolutions,
   said strip comprising along at least some portion of its length
   a layer of unbonded insulating fibers oriented mainly in directions normal to the height of the strip but being surface abradable, and
   a thin facing of abrasive-resistant material overlying at least one side of said layer, and
   strand material binding said fiber and facing along said portion into a unitary strip having abrasion resistance on said facing side.

2. A combination as claimed in claim 1 wherein said strip has one of said facings on both the top and bottom of said strip and said strand material binds both facings to said fiber layer.

3. A combination as claimed in claim 1 wherein said facing is a ribbon of corrugated foil and said strand material is helically wound around the strip to resist longitudinal separation of the corrugations of said foil.

4. A combination as claimed in claim 1 wherein said facing is a fabric stitched through and through to said fiber layer.

5. A combination as claimed in claim 1 wherein said facing contacts said inner tube and particles of getter are embedded between said fiber layer and said facing.

6. A combination as claimed in claim 1 having in addition a second spacer strip helically wound around said innner tube over said inner strip in the opposite direction with spaced convolutions so that said spacer strips cross one another at spaced points providing a double-thickness spacer dimension.

7. A combination as claimed in claim 6 wherein the pitch of both helically wound strips is uniform and regulated to provide four crossover points of double thickness in each revolution of each strip.

8. Packaged spacer means for flexible coaxial tubing comprising strip material including a layer of unbonded insulating glass fibers and getter particles, and
   a moisture-impermeable enclosure isolating said particles from ambient atmospheric moisture pending installation of said spacer means in said coaxial tubing.

9. Packaged spacer means as claimed in claim 8 wherein additional fiber layers are included at spaced intervals along said strip material.

10. Packaged spacer means as claimed in claim 9 wherein said moisture-impermeable material is foil and said getter particles are enclosed within said foil between said spaced fiber layers.

11. A cryogenic fluid enclosure comprising
    vacuum-tight coaxial inner and outer tubes,
    a plurality of concentric vacuum-tight tubes between said inner and outer tubes defining a space between said concentric tubes for flow of fluid under pressure,
    and spacer means separating said inner tube from said inner concentric tube and separating said outer concentric tube from said outer tube,
    the annular spaces formed by said spacer means being adapted to be evacuated, said spaced means comprising a layer of unbonded insulating fibers and a moisture impermeable enclosure isolating said fibers.

12. A cryogenic fluid enclosure comprising
    coaxial inner and outer tubes,
    a plurality of concentric tubes between said inner and outer tubes,
    strip spacing means including fibrous insulation helically wound around said inner tube with spaced convolutions to maintain said inner tube in spaced relation to the next outer tube, the included annular space being adapted to be evacuated,
    solid strip material helically wound around said next outer tube to maintain the next outermost tube spaced radially outwardly for flow of a cryogenic fluid in the included annular space, and
    strip spacing means including fibrous insulation helically wound in both directions around said last-named tube with spaced convolutions, and
    sheet insulating material wrapped circumferentially around said last-named strip spacing means within said outer tube.